Dec. 2, 1952     R. E. MUELLER     2,619,931
AUDIBLE BICYCLE
Filed Oct. 31, 1949     2 SHEETS—SHEET 1
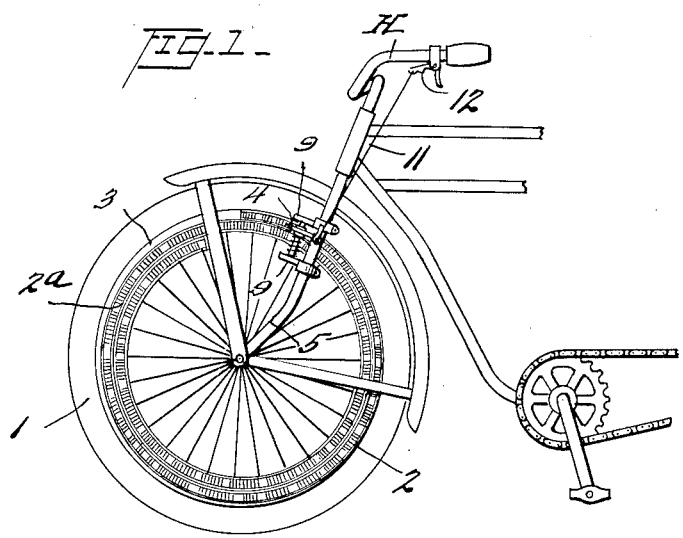
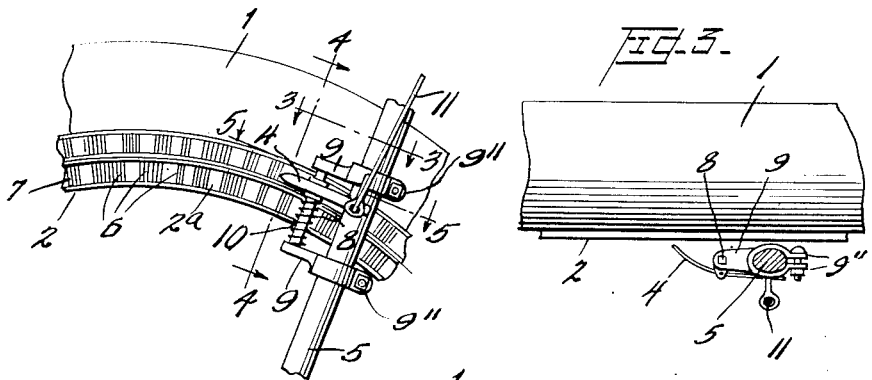
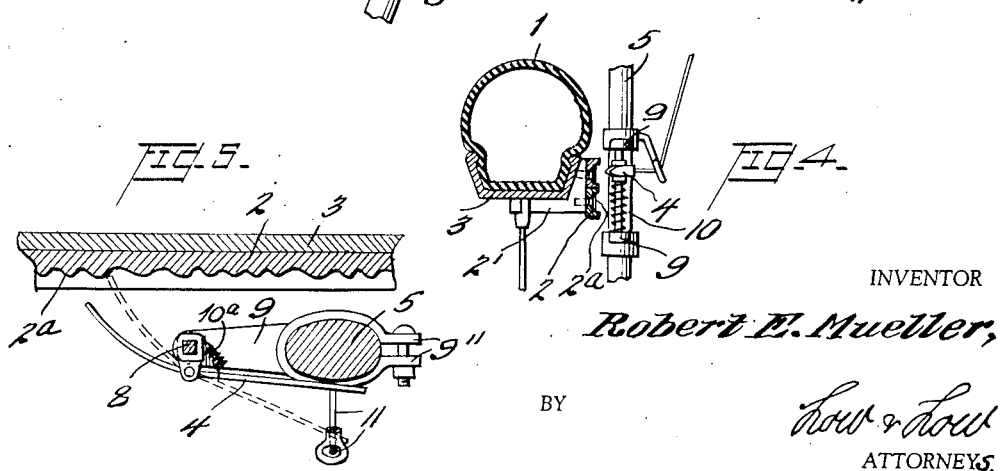
INVENTOR
Robert E. Mueller,
BY
Low & Low
ATTORNEYS.

Dec. 2, 1952  R. E. MUELLER  2,619,931
AUDIBLE BICYCLE
Filed Oct. 31, 1949  2 SHEETS—SHEET 2
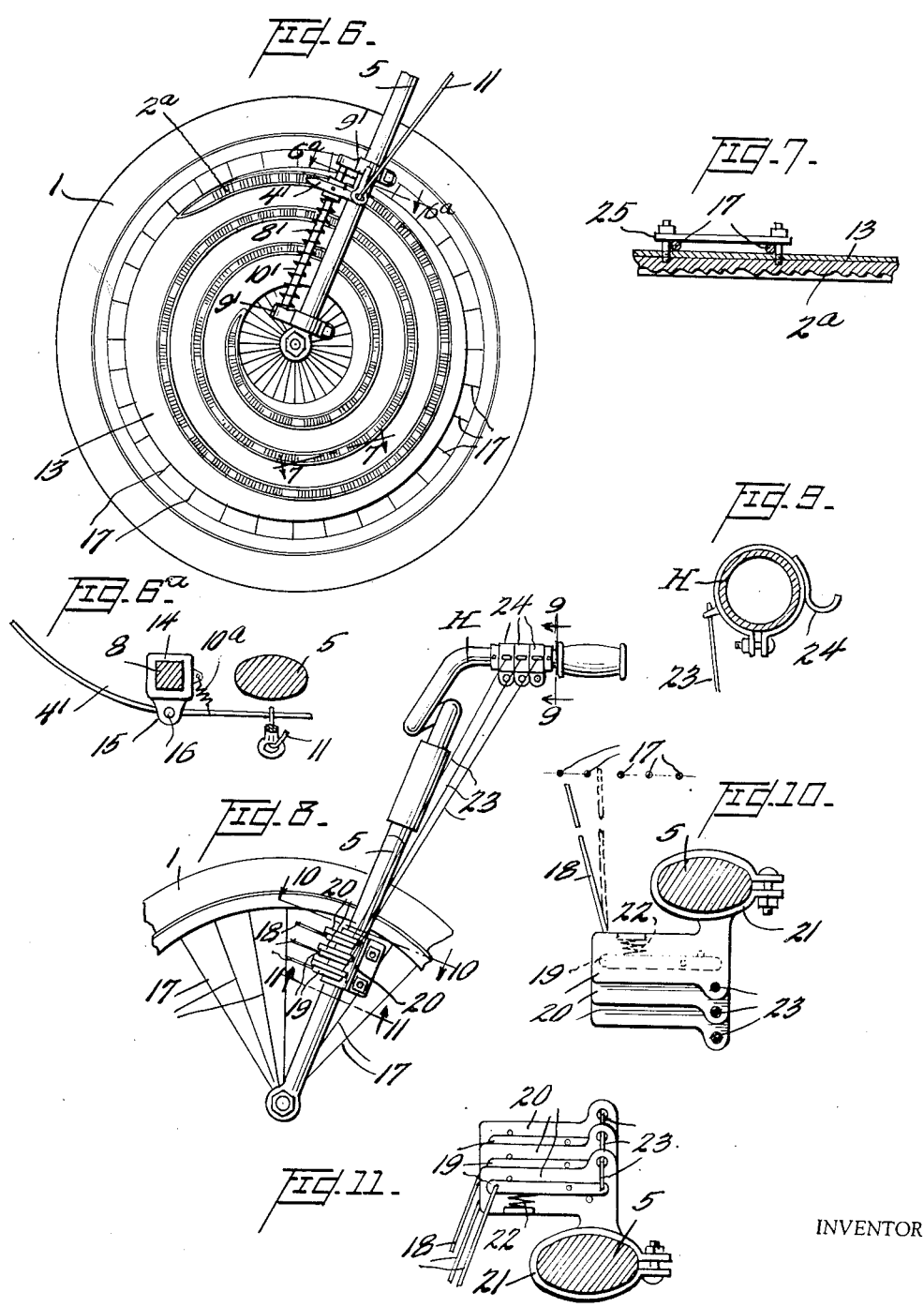
INVENTOR
Robert E. Mueller,
BY Row & Row
ATTORNEYS.

Patented Dec. 2, 1952

2,619,931

UNITED STATES PATENT OFFICE 2,619,931

AUDIBLE BICYCLE

Robert Emmett Mueller, New York, N. Y.

Application October 31, 1949, Serial No. 124,628

5 Claims. (Cl. 116—56)

This invention relates to audible bicycles or other vehicles and has for its object to provide such a vehicle having incorporated therein means whereby the rotating wheel of the machine is used as a sounding board or as a mount for a sounding board, to generate sounds reproducing spoken words or musical notes.

An object of the invention is to utilize a sound track mounted on or near the rim of said wheel to vibrate a stylus mounted on a relatively stationary part of the vehicle as the sound track travels in contact with the point of the stylus, thus generating sound in said wheel which acts as a sounding board to amplify said sounds. The sound track may comprise a narrow annular area on or near the wheel rim, or it may occupy the whole side area of the wheel in which case the sound track itself contributes most toward acting as a sounding board.

Another object of the invention is to employ the movement of the spokes of a rotating vehicle wheel to impart mechanical impulses to sounding reeds mounted on a relatively stationary part of the vehicle, thus producing musical sounds by the vibration of the reeds.

Other objects and features of the invention are set forth in the following description in connection with the accompanying drawings, wherein:

Fig. 1 is a side elevational view of the front part of a bicycle, showing the sound track on the rim of the wheel.

Fig. 2 is a view, on an enlarged scale, of a portion of Fig. 1, showing more in detail the sound track, the stylus and its mounting on the fork of a bicycle.

Fig. 3 is a sectional view, on line 3—3 in Fig. 2, of one branch of the fork, with a top plan view of the stylus, its mounting and a portion of the wheel.

Fig. 4 is a part-sectional view, on line 4—4 in Fig. 2, showing the tire, rim and sound track in section, and the stylus mounted on the fork in elevation.

Fig. 5 is a part-sectional view, on line 5—5 in Fig. 2, showing a section of the fork, rim and sound track, with a top plan view of the stylus and its mounting.

Fig. 6 is an elevational view similar to Fig. 1, showing the sound track distributed over the entire area of a metal disk attached to one side of the wheel.

Fig. 6a is a sectional view on line 6a—6a in Fig. 6, showing one manner in which the stylus may be associated with the fork and sound track.

Fig. 7 is an enlarged sectional view on line 7—7 in Fig. 6.

Fig. 8 is a side elevational view of the front part of a bicycle showing a modification of the invention, whereby the sounds are produced by reeds in striking engagement with the spokes of the wheel, as the wheel rotates in traveling.

Fig. 9 is a part-sectional view on line 9—9 of Fig. 8, showing the handle bar in section and a reed-operating key in elevation.

Fig. 10 is a part-sectional view on line 10—10 in Fig. 8, showing the fork in section and the reeds and their mounting in top plan view.

Fig. 11 is a part-sectional view on line 11—11 in Fig. 8, showing the fork in section and the reeds and their operating levers in bottom plan view.

The invention is intended as a novelty, yet it may successfully serve as a means for warning other riders, or pedestrians, of the presence of the vehicle on which it is mounted, so as to prevent accidents or congestion on the highway.

Primarily the invention as illustrated and described is intended to be attached to any conventional bicycle, and its operation is under the control of the rider of said bicycle. This improvement or device, however, without departing from the concept of the invention, may be mounted on any wheeled vehicle.

In the examples chosen to illustrate the invention, reference numeral 1 indicates the front wheel of a bicycle with which the device may be associated. A sound track 2a is or may be formed in an annulus 2 mounted on the rim 3 of the wheel by means of small lugs 2', as shown in Fig. 4. This sound track is spiral in form, in its limited extent, and the impressions thereon are designed to engage and cause movements of the point of the stylus 4 away from and toward the plane of the sound track, as it rotates with the wheel. This movement of the stylus, together with the resonance of the wheel rim and spokes, working against the fork 5 on which the stylus is mounted, generates sounds which are audible to those who are in the vicinity of the traveling vehicle.

The sound track shown in Figs. 1 and 2, is preferably integral with the annulus 2, which may be formed from thin sheet steel, with the plane of the annulus parallel to that of the wheel, and with ridges and grooves 6, as shown in Fig. 2, extending transversely of the lineal extent of the sound track, or radially of the wheel. The depth and spacing of the ridges and grooves determine the character, including the pitch and intensity, of the sounds produced.

The sound track 2a is formed in the bottom 7 of a spiral groove formed in the annulus. As shown in Fig. 4, the walls of this groove are sufficiently high to prevent the point of the stylus from becoming displaced by the jar of the wheel. The impressions in the sound track may be made according to any of the methods well known in the recording art. These impressions correspond to what is known as vertical recording, and may be incorporated in a sound track that would reproduce music. This could be done by electronically recording the sound on a paper film tape as hills and valleys. From this tape recording, one could make a die for the sound track by mechanicals means. Such methods are well known in the recording art; and it is also well known that even crude approximations produce surprisingly striking results. For this device it is unnecessary to have high fidelity reproduction.

The stylus 4 is slidingly mounted on a guide pin 8 carried by brackets 9, 9 on the fork of the bicycle, so that when the stylus is depressed into or engaged with the sound track groove, it may be forced laterally by the walls of the groove as the wheel rotates, and thereby be made to follow the entire lineal extent of the spiral groove and sound track. The brackets 9—9 are attached to the fork by yokes 9'', 9''.

As the stylus is thus forced laterally along the guide pin 8, it compresses a coil spring 10 surrounding the pin, and the reaction of the compressed spring restores the stylus to its original elevated position on the guide pin when the end of the stylus is restored to its normal position out of contact with the groove.

The point of the spring-urged stylus is normally held out of contact with the sound track by a coil spring 10a, as best shown in Fig. 6a.

A cord, wire, small chain or the like 11 extends from the stylus to a lever 12 on the handle bar H within reach of the rider, so that the pivoted stylus may be drawn into contact with the sound track by the rider against the tension of spring 10a. This cord may be trained around small pulleys or through small holes in the parts of the assembly, or of the bicycle, so that the pull on the stylus will be exerted in the direction to force it into contact with the sound track.

In Fig. 6 the spiral trough and track are shown as applied to the entire side area of the metal disk 13 affixed to the spokes 17 of the wheel by means of bolted or clamped clips 25, as shown in Fig. 7. In this embodiment of the invention the metal disk substantially acts as the sounding board to generate the sounds recorded thereon, rather than the wheel as in the previous embodiment. The drawing is merely illustrative, as the coils of the spiral track may be much more closely spaced than they are shown, so that the total length of the track is sufficient to produce a recording of considerable duration.

As is fully apparent, the form of the invention shown in Fig. 6 is only a slight variation from that in Fig. 1, the main differences being that the sound track in Fig. 6 is much longer than in Fig. 1, and that it is formed in a disk, instead of in an annulus, and that the disk itself which has the sound track on it is used as the sounding board instead of the wheel, whose contribution now towards generating the sound is relatively small. In Fig. 6 elements 4', 8', 9' and 10' correspond in structure and function, respectively, to elements 4, 8, 9 and 10 in Figs. 2, 3, 4 and 5.

As shown more clearly in Fig. 6a, the support or guide pin 8 is square in cross-section and is embraced by a sliding collar 14 having ears 15 through which a pivot pin 16 extends. The stylus is arranged to vibrate on pivot 16 when the point of said stylus is in contact with the moving sound track.

In the form of the invention shown in Figs. 8, 9, 10 and 11 the sounds are produced by the spokes 17 of the wheel striking the reeds 18 when the ends thereof are brought into the path of the moving spokes. The reeds are each so constructed as to produce its own distinctive note. In the drawings three reeds are shown, but more or fewer thereof may be used without departing from the basic invention.

As shown in Figs. 10 and 11, each reed 18 has one end rigidly fixed to a small lever 19 pivoted intermediate its ends on a small carrying bracket 20. The brackets are fixed side by side on a sleeve 21 removably attached to one branch of the fork 5. Each lever 19 is urged by a spring 22 in a direction to hold its attached reed out of contact with the wheel spokes; and when desired, each reed is brought into contact with the spokes by the pull of a cord or the like 23 attached to its lever 19 at the end remote from the reed.

Each cord 23 has its end remote from its associated lever attached to a small key 24 operatively mounted on the handle bar H, as shown in Figs. 8 and 9. By pressing the keys 24 the operator may selectively pull the cords 23 and bring the ends of the reeds into contact with the moving spokes, and thus produce the musical notes, either singly or in harmonious combination.

It is obvious that the sounds produced by any of the above means are considerably amplified by the resonance of the wheel 1 or of the disk 13 acting as a sounding board.

The operation of the device is believed to be made clear in the foregoing description. The rider of the bicycle manipulates the hand lever 12 (Fig. 1) to bring the stylus 4 into contact with the sound track 2a, or the keys 24 to bring the reeds 18 into contact with the spokes 17, as the wheel rotates, to produce the desired sounds.

It is not intended that the invention be limited to the particular embodiments shown and described. On the contrary the invention is intended to include all modifications and variations coming within the scope and meanings of the appended claims.

What is claimed is:

1. A bicycle having a sound track mounted on a wheel thereof, a stylus movably mounted on the bicycle frame adjacent said wheel, and means mounted on the bicycle frame and connected to said stylus for engaging the stylus with said sound track to produce sound as the wheel rotates with the travel of the bicycle.

2. In combination, a bicycle wheel, a sound track on the side of the wheel, a stylus pivoted on the fork of the bicycle frame and engageable with the sound track, an operating lever on the handle bar of the bicycle, and an elongated flexible element connecting the stylus to the lever, for bringing the stylus into contact with the sound track to produce a sound as the wheel travels.

3. A vehicle having a spiral sound track on the side surface of a wheel thereof, a pivoted stylus slidably mounted on the frame of the vehicle adjacent said wheel, a lever mounted on the vehicle frame and connected to said stylus for engaging the stylus with said sound track to produce a sound as the wheel rotates with the travel of said vehicle, and spring means on said frame normally urging the stylus and its slidable mounting in a direction radially of said wheel to a locality adjacent one end of said spiral sound track.

4. A warning device for bicycles and the like, comprising a sound track of spiral configuration attached to the side surface of a bicycle wheel, a movable vibratable stylus pivotally and slidably mounted on the frame of the bicycle adjacent said sound track, means mounted on said frame for engaging the point of said stylus with the sound track, spring means normally holding said stylus out of engagement with said track, and other spring means for urging the said slidable mounting of said stylus in a direction radially outwardly of said wheel to a locality adjacent the outer end of said spiral sound track.

5. An audible bicycle comprising a frame including a wheel fork and a handle bar carried on a wheel, a spiral recorded sound track carried on the side of the wheel, a pair of spaced brackets carried on the fork, a guide pin carried by the brackets, a collar surrounding the guide pin and having spaced perforated ears attached to one side thereof, a pivot pin in the perforations of the spaced ears, a stylus pivoted intermediate its ends on the pivot pin, and with one end adjacent the sound track, a coil spring surrounding the guide pin and urging the collar toward one end of said guide pin, an operating lever carried on the handle bar, and an elongated flexible element connecting the operating lever with an end of the stylus, for causing the point of the stylus to engage the sound track to thus reproduce the recorded sound, as the sound track is rotated by the traveling wheel.

ROBERT EMMETT MUELLER.

REFERENCES CITED

The following references are of record in the file of this patent:

UNITED STATES PATENTS

| Number | Name | Date |
|---|---|---|
| 595,334 | Paehtz | Dec. 14, 1897 |
| 1,031,993 | Foster | July 9, 1912 |
| 2,367,430 | Redlund | Jan. 16, 1945 |
| 2,504,042 | Ottofy | Apr. 11, 1950 |

FOREIGN PATENTS

| Number | Country | Date |
|---|---|---|
| 19,670 | Great Britain | Dec. 10, 1908 |